Patented May 9, 1939

2,158,040

UNITED STATES PATENT OFFICE 2,158,040

PROCESS FOR HYDROGENATION OF KETONES

Joseph Blumenfeld, Paris, France

No Drawing. Application October 24, 1938, Serial No. 236,781. In France October 14, 1937

5 Claims. (Cl. 260—638)

My invention relates to an improved process for the liquid phase hydrogenation of aldehydes and ketones.

The favorable action of alkalies in the catalytic hydrogenation of aldehydes and ketones has been previously disclosed but, under the conditions employed by the prior investigators, the hydrogenation necessitated, in order to be effected with a sufficient degree of speed, either the use of rather high pressures and temperatures, or high proportions of catalyst and solvent.

It is on account of this fact that in one of the most recently described methods, the hydrogenation of acetone is accomplished at ordinary pressure and temperature in the presence of active nickel serving as a catalyst, but only with the use of a solvent comprising a solution of caustic soda in a large quantity of methyl or ethyl alcohol. This method presents, for its industrial use, the disadvantage of necessitating separating from the hydrogenation product the large volume of solvent which accompanies it. This separation is practically impossible in the case where the product obtained is isopropyl alcohol and the solvent is ethyl alcohol, and it is very difficult in the case where the solvent is methyl alcohol.

It has heretofore been supposed that the hydrogenation would be impossible without a solvent and that this is due to the almost complete insolubility of the caustic soda in the aldehydes or ketones being treated. It has been supposed that, in the absence of sufficient alcohol to completely dissolve the caustic soda, this latter would form a coating on the catalyst and prevents its catalytic action.

According to the present invention it is not necessary, in order to assist the catalytic hydrogenation, to employ an aqueous solution of an alkali in a large quantity of alcoholic solvent. In my process, I utilize an alcoholate soluble in the material being hydrogenated, for example, an alcoholate of sodium or potassium. In practice I may advantageously employ the alcoholate which corresponds to the alcohol to be produced by the hydrogenation.

In order to avoid hydrolysis of the alcoholate with resulting liberation of alkali, the reaction should be carried out in a practically anhydrous medium.

But experiments have proved that a very small amount of water, up to one percent for instance in the case of acetone, may be tolerated.

Also, according to the present invention, the alcohol obtained by hydrogenation, after separation of the catalyst, is preferably freed from alkali or alcoholate, by action of carbonic acid followed by simple filtration.

As an example, and in order to facilitate the understanding of the present description, the following procedure may be employed for the hydrogenation of acetone: The desired action may be obtained by the addition of sodium isopropylate, which may be prepared by dissolving 1.2 grams of sodium in 200 cc. of practically anhydrous isopropyl alcohol. Approximately 12 cc. of this solution of isopropylate in isopropyl alcohol and 5 grams of active nickel is added to 56 g. of acetone, and the hydrogenation is completed at ordinary temperature and pressure in 2 or 3 hours. The conversion is practically complete. It will be observed that the amount of sodium isopropylate, as given in this example is small, namely about 0.003 mole of the isopropylate to 1 mole of acetone.

By simple decantation, the isopropyl alcohol formed is separated from the bulk of the catalyst, which latter is suitable for re-use in the process. The isopropyl alcohol may be readily freed from particles of entrained nickel, and its sodium content, by passing carbon dioxide gas therethrough, followed by filtration. The carbonate formed precipitates in the form of a gel which carries with it the nickel particles.

The isopropyl alcohol thus purified is in a condition suitable for most uses. Further purification can, however, easily be accomplished by rectification, which will serve to separate other impurities derived from the acetone or from a secondary action of the catalyst, and which may be present in amounts as high as 5%-6%.

The same process may advantageously be applied to other ketones, such as methyl-ethyl ketone, diethyl ketone, acetophenone, benzylidene ketone, etc.

The process may in certain cases, and with the preceding restrictions, be advantageously employed with the use of heat, with or without pressure, and the nickel may be replaced with other catalysts of known types.

What I claim is:

1. A process of making an alcohol by hydrogenation, which comprises reacting hydrogen gas from an extraneous source upon a ketone while said ketone is in a liquid state, diluted with an alcohol and mixed with a substantially smaller amount of an alcoholate of an alkali metal, while in the presence of a hydrogenation catalyst, the reaction mixture being free from more than 1% of water.

2. A process of making an alcohol by hydrogenation, which comprises reacting hydrogen gas from an extraneous source upon a ketone while said ketone is in a liquid state, diluted with the alcohol which is to be produced in the hydrogenation reaction, and mixed with a substantially smaller amount of an alcoholate of an alkali metal, which alcoholate contains the alcohol radical of the alcohol which is to be produced by hydrogenation of said ketone, and while in the presence of a hydrogenation catalyst, the reaction mixture being free from more than 1% of water.

3. A process of making an alcohol by hydrogenation, which comprises reacting hydrogen gas from an extraneous source upon a ketone while said ketone is in a liquid state, diluted with the alcohol which is to be produced in the hydrogenation reaction, and mixed with a substantially smaller amount of an alcoholate of an alkali metal, which alcoholate contains the alcohol radical of the alcohol which is to be produced by hydrogenation of said ketone, and while in the presence of a hydrogenation catalyst, the reaction mixture being free from more than 1% of water, and thereafter introducing carbon dioxide into the liquid reaction product to decompose any residue of alkali metal alcoholate and to convert the alkali metal into its carbonate, which is insoluble in said alcohol, and separating the precipitated alkali carbonate.

4. A process of making an alcohol by hydrogenation, at about atmospheric temperature and pressure, which comprises reacting hydrogen gas from an extraneous source upon a ketone, while said ketone is in a liquid state, diluted with the alcohol which is to be produced in the hydrogenation reaction, and mixed with a substantially smaller amount of an alcoholate of an alkali metal, which alcoholate contains the alcohol radical of the alcohol which is to be produced by hydrogenation of said ketone, and while in the presence of a hydrogenation catalyst, the reaction mixture being free from more than about 1% of water.

5. In a process for the liquid phase catalytic hydrogenation of acetone, the improvement which comprises effecting the hydrogenation of the acetone while diluted with isopropyl alcohol, in a solution containing approximately 0.003 moles of an alkali metal isopropylate per mole of acetone.

JOSEPH BLUMENFELD.